(12) United States Patent
Purcell

(10) Patent No.: US 6,290,424 B1
(45) Date of Patent: Sep. 18, 2001

(54) SEGMENTED RING MOUNTING FOR A FLUID-OPERATED PERCUSSION DRILL TOOL

(75) Inventor: Joseph Purcell, Co. Clare (IE)

(73) Assignee: Minroc Technical Promotions Ltd. (IE)

( * ) Notice: Subject to any disclaimer, the term of this patent is extended or adjusted under 35 U.S.C. 154(b) by 0 days.

(21) Appl. No.: 09/447,337

(22) Filed: Nov. 22, 1999

(30) Foreign Application Priority Data

Nov. 27, 1998 (IE) ................................................ S980988

(51) Int. Cl.$^7$ ................................. F16B 7/00; E21B 4/14
(52) U.S. Cl. ........................... 403/328; 403/366; 175/296
(58) Field of Search ................................... 403/328, 327, 403/326, 366, 344, 365, 371, 310, 311, 313, 12, 297; 175/296, 300, 304; 255/123.4, 123.5, 123.6, 123.12, 321

(56) References Cited

U.S. PATENT DOCUMENTS

| | | | |
|---|---|---|---|
| 2,855,003 | * 10/1958 | Thaxton | 285/123.6 X |
| 3,797,336 | * 3/1974 | Howe | 81/125 |
| 4,598,916 | * 7/1986 | McGehee | 279/2.03 |
| 4,630,958 | 12/1986 | McCallister | 403/257 |
| 5,005,877 | * 4/1991 | Hayman | 285/321 X |
| 5,209,521 | 5/1993 | Osborne | 285/3 |
| 5,542,481 | 8/1996 | Scott | 175/23 |
| 5,685,380 | * 11/1997 | Purcell et al. | 175/215 |

FOREIGN PATENT DOCUMENTS 0798815   10/1997   (EP) .
2296731   7/1996   (GB) .

OTHER PUBLICATIONS

Examiner Bellingacci, F., European Search Report for Application No. EP 99203902, Mar. 21, 2001, pp. 1–3.

* cited by examiner

Primary Examiner—Harry C. Kim
(74) Attorney, Agent, or Firm—Cahill, Sutton & Thomas P.L.C.

(57) ABSTRACT

A segmented ring mounting (5) for retaining cylindrical components (2, 3) one within the other in a fluid-operated percussion drill tool, such as a downhole rock drill. The ring mounting also has application to other interengaging cylindrical components which are subject to heavy wear or pressure loading, such as compressors, pumps, borehole tools, casings and drillpipe mountings. The retaining ring (5) seats a smaller diameter cylindrical component (3) within a larger diameter cylindrical component (2), wherein one of the components is formed with a groove (12) or shoulder for seating the retaining ring in use, the ring being capable of radial compression and expansion so as to expand radially into the seating groove or shoulder for retaining the components one within the other in use. The retaining ring comprises at least three segments (7, 8, 9), which when touching end to end form a complete circle, and expansible holding means (11) such as an O-ring, for holding the segments together but allowing the segments to expand radially and move apart by a sufficient amount so as to seat the segments in the groove (12) or against the shoulder.

11 Claims, 4 Drawing Sheets

SEGMENTED RING MOUNTING FOR A FLUID-OPERATED PERCUSSION DRILL TOOL

FIELD OF THE INVENTION

The present invention relates to a segmented ring mounting for retaining cylindrical components one within the other in a fluid-operated percussion drill tool, such as a downhole rock drill. However, the invention has application to other interengaging cylindrical components which are subject to heavy wear or pressure loading, such as compressors, pumps, borehole tools, casings and drillpipe mountings.

BACKGROUND OF THE INVENTION

Conventional fluid-operated percussion drill tools comprise an external cylinder or outer wear sleeve, within which is mounted an inner cylinder which in turn engages with a backhead assembly. A sliding reciprocating piston cooperates with the inner cylinder and backhead assembly, which when air pressure is supplied through the backhead assembly, acts with a percussive effect on a drill bit retained within a chuck on the outer wear sleeve.

In conventional arrangements, the inner cylinder is effectively suspended within the outer wear sleeve by means of a compressible retaining ring, such as a circlip, which has to be slid up the inner cylinder so as to seat against a shoulder or lip at one end thereof, being compressed when the inner cylinder is dropped down within the outer wear sleeve, and then expanding outwardly into a groove or shoulder formed on the inner diameter of the outer wear sleeve with a snap action. When in this position, the circlip seats within the groove and abuts against the lip of the inner cylinder, by which the inner cylinder is suspended within the outer wear sleeve. Compression of the circlip requires considerable force during this assembly operation.

A disadvantage with the circlip mounting system is that the inner cylinder may move during operation because of vibration, and the lip may become deformed, and unevenly worn due to wear between the lip and the circlip. The circlip is not a complete ring and includes a gap, and there is therefore no wear on the lip above the circlip gap. The hardness of the steel from which the inner cylinder and the circlip are made may not be the same, which also contributes to wear between these two components.

However, if the inner cylinder is removed from the outer wear sleeve for maintenance or inspection purposes, and then reassembled in the manner described above, the circlip is most likely to snap into place in the groove in the outer wear sleeve in a different position, i.e. the circlip gap is likely to be in a different position, so that wear between the circlip and the lip of the inner cylinder will be concentrated on a different portion of the lip. With continued wear, the result is that a slightly raised portion of the lip or lump will develop, and the presence of one or more lumps around the circumference of the lip caused by this uneven wear will result in poorer engagement between the inner cylinder and the outer wear sleeve, and even a skew or off-center between the two cylindrical components, which will rapidly increase wear between the components and shorten the life of the downhole drill.

The present invention seeks to provide a solution to the general problem of awkwardness and difficulty of assembly and reassembly of parts using a conventional circlip mounting, and furthermore to address the problems caused by uneven wear between the conventional circlip and the lip of the inner cylinder.

SUMMARY OF THE INVENTION

According to the present invention there is provided a retaining ring for seating a smaller diameter cylindrical component within a larger diameter cylindrical component, wherein one of the components is formed with a groove or shoulder for seating the retaining ring in use, the ring being capable of radial compression and expansion so as to expand radially into the seating groove or shoulder for retaining the components one within the other in use, characterized in that the retaining ring comprises at least three segments, which when touching end to end form a complete circle, and expansible holding means biassed to hold the segments together but of sufficient elasticity to allow the segments to expand radially and move apart by a sufficient amount so as to seat the segments in the groove or against the shoulder.

Preferably, the segments are formed with an outer groove, and the holding means comprises an O-ring placed in the outer groove.

Advantageously, the smaller diameter cylindrical component includes a lip for engagement with the retaining ring, and an inclined surface defined between the lip and an outer diameter of the said smaller diameter cylindrical component, which inclined surface causes the segmented retaining ring of the present invention to slide into abutting engagement with the lip and causes it to expand into the seating groove or against the shoulder, when the smaller diameter cylindrical component is dropped inside the larger diameter cylindrical component during assembly of the two cylindrical components.

DETAILED DESCRIPTION OF EXEMPLARY EMBODIMENTS

Figure 1:
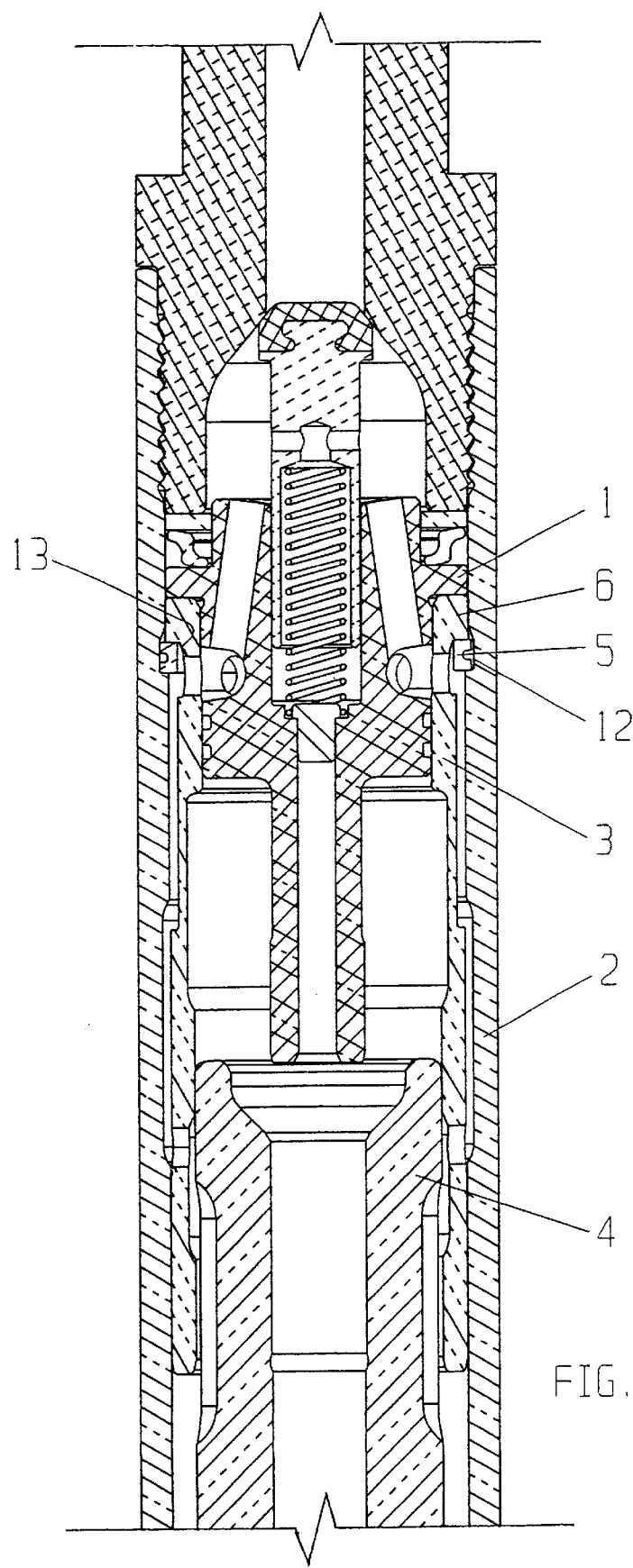
FIG. 1 is a partial cross-sectional view showing the inner cylinder, outer wear sleeve and backhead assembly and part of a piston of a downhole hammer drill, with a retaining ring, according to the present invention shown in heavy black outline.
Figure 2:
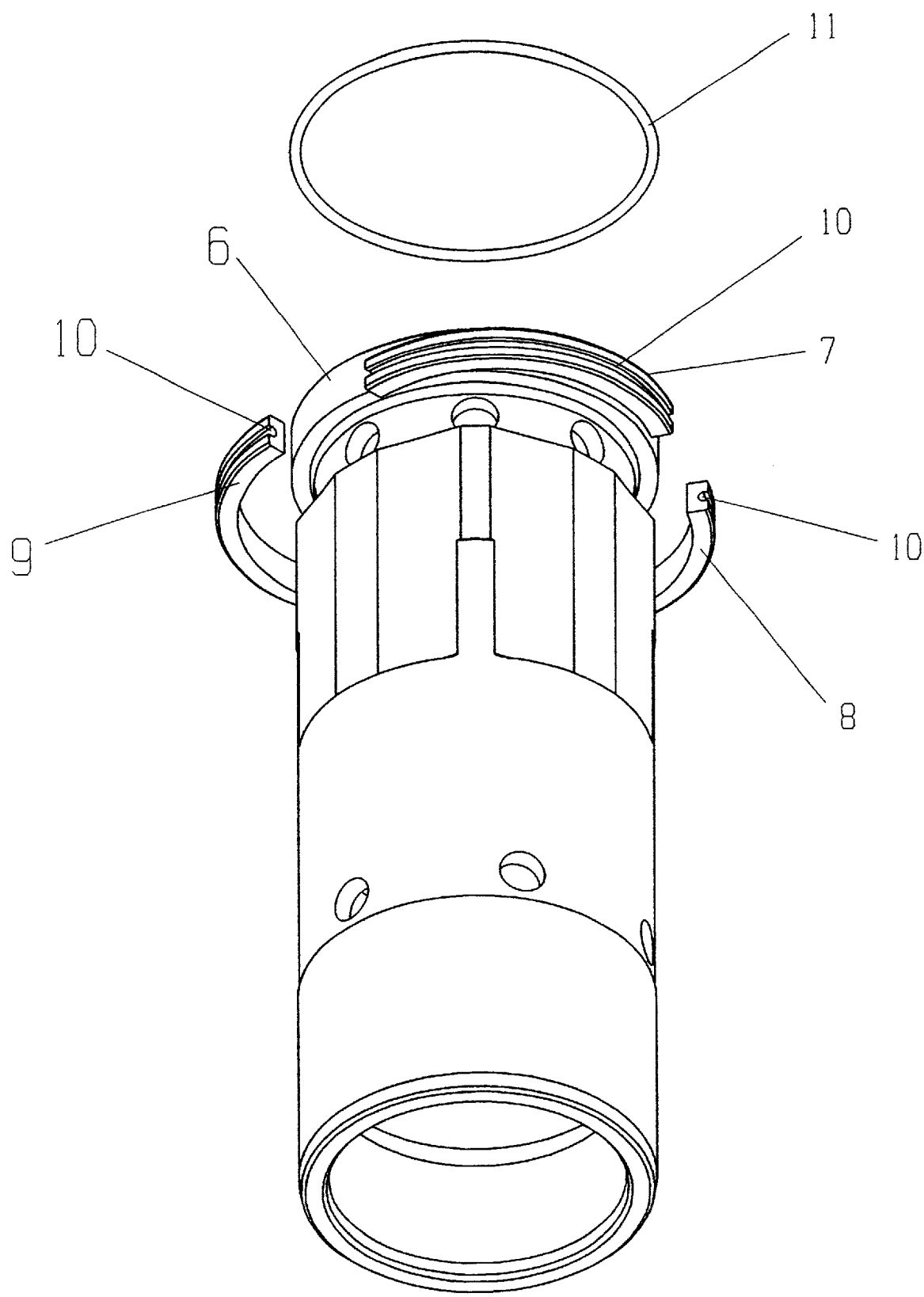
FIG. 2 is a perspective view of the inner cylinder, and an exploded view of the three segments and O-ring of the retaining ring of the present invention, before assembly.

The parts and functioning of the downhole hammer drill illustrated in FIG. 1 will not be described in detail, but the parts shown include a backhead assembly 1, an outer (larger diameter) wear sleeve 2, an inner (smaller diameter) cylinder 3, a piston 4, wherein the outer wear sleeve 2 includes a groove 12 cut on its inside diameter for seating a retaining ring 5, against a lip 6 of the inner cylinder. The invention relates to the novel retaining ring 5, which suspends the smaller diameter cylindrical component 3 inside the larger diameter cylindrical component 2.

Figure 3:
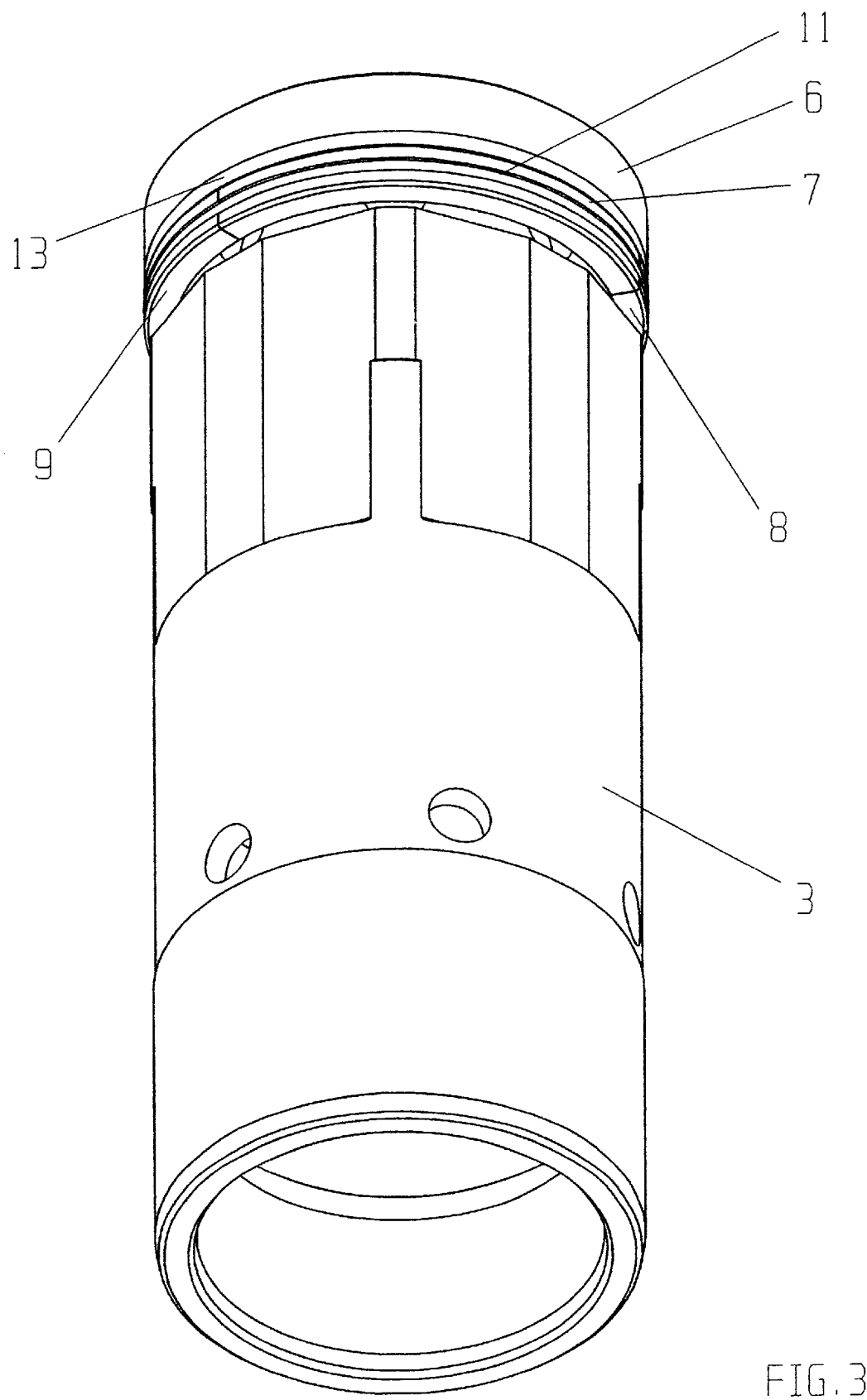
FIG. 3 is a perspective view, similar to FIG. 2, with the retaining ring in place below the lip of the inner cylinder, but not yet expanded.

The retaining ring 5 of the invention comprises three identical arc-shaped segments 7, 8 and 9, each formed with an outer groove 10, for the purpose of seating an elastomeric O-ring 11, as shown in FIG. 3.

It will be appreciated that when each segment is held tightly against the adjacent segment by means of the O-ring 11, no gaps are present between the adjacent segments, as shown in FIG. 3. In this position, the retaining ring is fully compressed and forms a complete circle.

Figure 4:
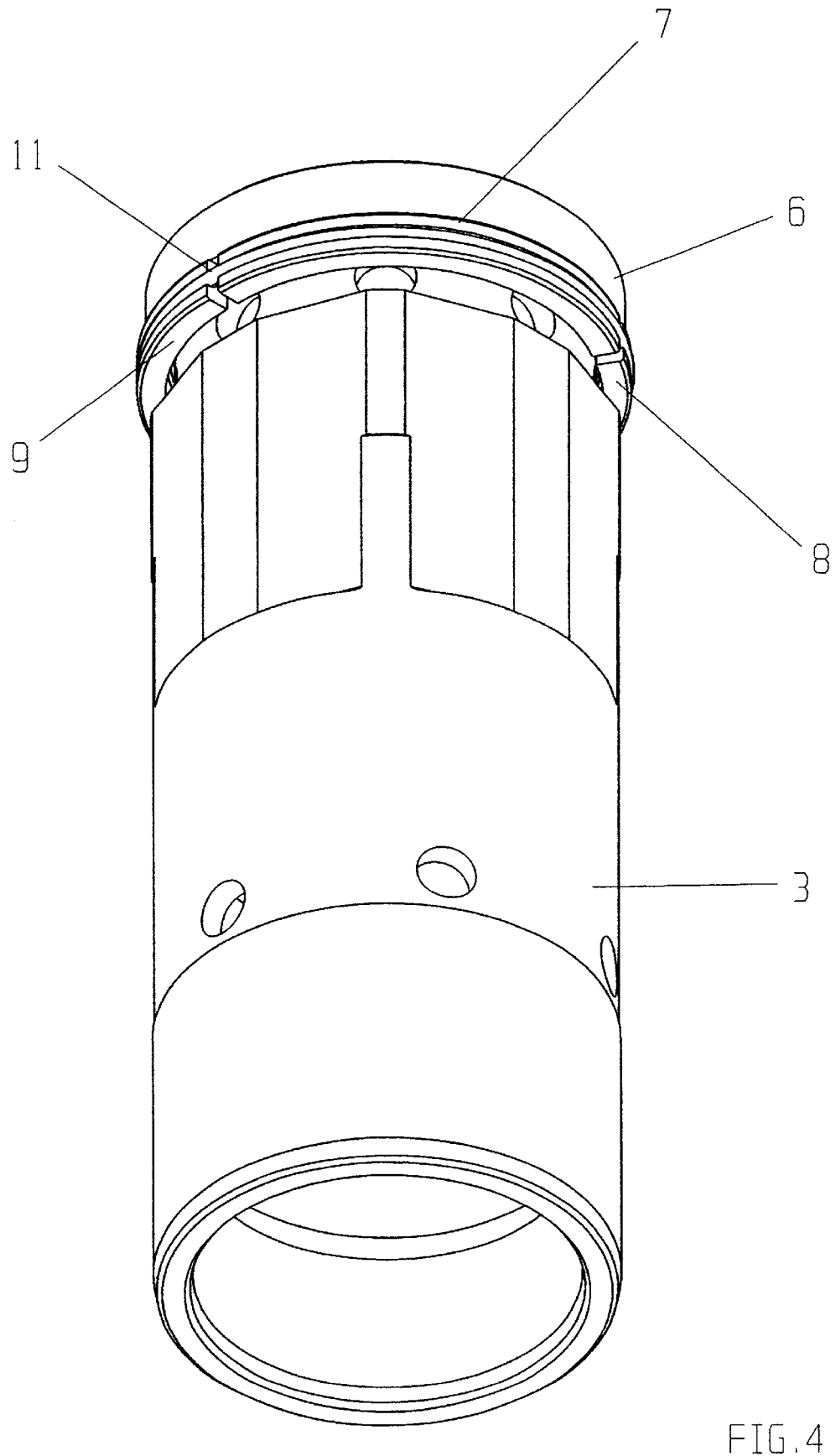
FIG. 4 is a perspective view, similar to FIGS. 2 and 3, with the retaining ring seating against the lip of the inner cylinder in an expanded condition.

When the inner cylinder 3 is slid into position within the outer wear sleeve 2, the lowermost surface of the retaining ring 5 firstly seats against a shoulder provided by the base of groove 12, formed by an increase in the internal diameter of the outer wear sleeve. Continued downward pressure causes a taper or inclined surface 13 defined between the enlarged diameter overhanging lip 6 and the outer diameter of the inner cylinder, to bear against an inside edge of the segmented retaining ring, causing it to ride over the inclined surface 13 and expand radially, against the bias of the O-ring, thus causing small gaps between the segments 7, 8, 9, until the retaining ring is fully expanded and abutting against the overhanging lip 6, and seating fully into the groove 12, in the position as shown in FIGS. 1 and 4.

This mode of assembly and interengagement is achieved with a fraction of the force required to engage a conventional circlip. It will be appreciated that circlip is naturally biased to flex forcibly towards an expanded condition. The ring of the present invention is naturally biassed with a much weaker force towards a compressed condition. Furthermore, the segments will expand evenly so that the gaps between them should be the same, when seated in place. It is only at these small gaps where less wear of the lip will occur, but this is minimised by the relatively small size of the gaps, relative to the single gap in a conventional circlip. In embodiments with more than three segments, the gaps between adjacent segments at full expansion of the ring when seated become even smaller.

Because the retaining ring of the present invention most preferably comprises three segments, there will be three gaps with an equal distance between each gap around the circumference of the lip. If a small lump should develop on the lip above each gap, this will not cause a skew as tends to happen with the large single gap of the prior art circlip because of the equal distribution of the three gaps/lumps. In contrast, if a second lump develops with a circlip wear pattern, the two tend to be randomly spaced, and can still cause a skew.

Furthermore, removal of the inner cylinder for inspection or maintenance during use and subsequent replacement of the retaining ring of the invention, even if in a different position, is still unlikely to cause any tendency for skewing or off-centering between the inner cylinder and outer wear sleeve. This is because any re-positioning of the retaining ring relative to the inner cylinder lip would result only in a multiplicity of small randomly spaced lumps on the lip.

It will be appreciated that the O-ring only serves the purpose of holding the segments together during assembly and once seated firmly in place, the individual segments will not tend to move relative to each other because of the compressive forces acting on them when the drill is in use, and the tight interfitting of components when not in use. However, other means of holding and biassing the segments together, either temporarily during assembly of parts, or permanently during use in their seated arrangement, are also contemplated. The O-ring may provide a seal, but this is not essential.

What is claimed is:

1. A drill tool assembly, including a smaller diameter cylindrical component suspended within a larger diameter cylindrical component, wherein one of the components is formed with means for seating a retaining ring in abutment therewith, said retaining ring being adapted for radial compression and expansion such that on radial expansion it abuts said seating means, and wherein the other of the components includes means for causing said retaining ring to be urged into an expanded state, said retaining ring comprising:
   a) at least three segments, which when touching end to end extend about one of the components, each of said segments including an outer groove; and
   b) expansible holding means in engagement with said outer grooves for biasing and holding said segments together, but being of sufficient elasticity to allow said segments to expand radially and be urged apart by a sufficient amount so as to engage said segments with the seating means.

2. A tool assembly according to claim 1, wherein said holding means comprises an elastomeric O-ring in said outer groove.

3. A tool assembly according to claim 1, wherein said at least three segments are identical.

4. A tool assembly according to claim 1, wherein said at least three segments comprise three segments.

5. A fluid-operated drill tool assembly, said assembly comprising: p1 a) a larger diameter cylindrical components;
   b) a smaller diameter cylindrical component suspendable within said larger diameter cylindrical component;
   c) one of said components being formed with means for seating a retaining ring in abutment therewith, said retaining ring being adapted for radial compression and expansion such that on radial expansion said retaining ring abuts said seating means;
   d) the other of said components being formed with means for causing said retaining ring to be urged into an expanded state upon suspension of said smaller diameter cylindrical component within said larger diameter cylindrical component
   e) said retaining ring comprising:
      1) at least three segments, said segments, when touching end to end, forming a complete circle, each of said segments including an outer groove; and
      2) expansible holding means in engagement with said outer grooves for biasing and holding said segments together but being of sufficient elasticity to allow said segments to expand radially to the expanded state to engage in abutment with said seating means.

6. An assembly according to claim 5, wherein said seating means includes a groove on the inside of said larger diameter cylindrical component.

7. An assembly according to claim 5, wherein said seating means includes a shoulder on the inside of said larger diameter cylindrical component.

8. An assembly according to claim 5, wherein said means for causing said retaining ring to be urged into the expanded state, comprises an inclined surface defined between an enlarged diameter lip and an outer diameter of said smaller diameter cylindrical component, which inclined surface causes said segments of said retaining ring to expand radially when said retaining ring engages and rides over said inclined surface to slide into abutting engagement with said lip and expand into engagement with said seating means when said smaller diameter cylindrical component is suspended inside said larger diameter cylindrical component during assembly of said smaller and larger diameter cylindrical components.

9. An assembly according to claim 5, wherein said means for causing said retaining ring to be urged into the expanded state comprises an inclined surface defined between an enlarged diameter lip and an outer diameter of said smaller diameter cylindrical component, said inclined surface being adapted to cause said segments of said retaining ring to expand radially upon engagement with and traverse along said inclined surface and slide into abutting engagement with said lip and expand into engagement with said seating means, when said smaller diameter cylindrical component is suspended within said larger diameter cylindrical component during assembly of said smaller and larger diameter cylindrical components.

10. A drill assembly, including a smaller diameter cylindrical component suspended within a larger diameter cylindrical component, wherein one of the components is formed with a means for seating a retaining ring in abutment therewith, said retaining ring being capable of radial compression and expansion such that on radial expansion it abuts said seating means, and wherein the other of the components is formed with a means for urging said retaining ring into an expanded state, said retaining ring comprising:

a) at least three segments, said segments, when seated in abutment with said seating means being arranged circumferentially about the one component, each of said segments including an outer groove; and b) expansible holding means in engagement with said outer groove for biasing said segments to hold said segments together, but being of sufficient elasticity to allow said segments to expand radially in response to said urging means and be urged apart by a sufficient amount to engage said segments in abutment with said seating means.

11. In a fluid operated drill tool assembly having a smaller diameter cylindrical component suspended within a large diameter cylindrical component and means for seating a radially expandable segmented retaining ring in abutment with a shoulder thereof formed in one of the cylindrical components and a means for urging said retaining ring into an expanded state in the other of the cylindrical components, the improvement comprising said retaining ring having at least three segments touching end to end to form a complete circle and each of said segments including an outer groove and an expandable holding means for engaging said outer groove and biasing said segments to hold said segments together and for allowing said segments to expand radially in response to the urging means to bring about engagement of said segments with the shoulder of the seating means.

* * * * *